United States Patent
Schadewald et al.

(10) Patent No.: US 6,425,571 B1
(45) Date of Patent: Jul. 30, 2002

(54) VALVE AND METHOD FOR FORMING VALVE

(75) Inventors: Christopher E. Schadewald, Whitehouse; Michael P. Wells, Holland; Ryan J. Williams, Toledo, all of OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/634,910

(22) Filed: Aug. 9, 2000

(51) Int. Cl.⁷ .......................... F16K 51/00; F16K 5/06
(52) U.S. Cl. ............. 251/315.13; 251/286; 251/315.01
(58) Field of Search ................................. 251/118, 120, 251/174, 180, 286, 314, 315.01, 315.14, 315.13

(56) References Cited

U.S. PATENT DOCUMENTS

| | | | |
|---|---|---|---|
| 982,815 A | * | 1/1911 | Hobbs |
| 2,973,182 A | * | 2/1961 | Gill |
| 3,387,815 A | * | 6/1968 | Richards |
| 3,743,243 A | * | 7/1973 | Scaramucci ................. 251/288 |
| 4,342,444 A | * | 8/1982 | Sonderman ................. 251/315 |
| 4,467,823 A | * | 8/1984 | Shaffer et al. ............... 137/15 |
| 4,741,361 A | * | 5/1988 | McHugh ...................... 137/559 |
| 4,815,701 A | * | 3/1989 | Stone .......................... 251/174 |
| 4,821,765 A | * | 4/1989 | Iqbal et al. .................. 137/270 |
| 5,010,917 A | * | 4/1991 | Iqbal ......................... 137/454.6 |
| 5,102,098 A | * | 4/1992 | Daghe et al. ............... 251/315 |
| 5,735,047 A | | 4/1998 | Evans et al. ............. 29/890.13 |
| 5,857,663 A | * | 1/1999 | Evens et al. ........... 251/315.14 |
| 5,988,220 A | * | 11/1999 | Sakaki ................... 137/625.47 |
| 6,186,471 B1 | * | 2/2001 | Genga et al. .......... 251/129.16 |

OTHER PUBLICATIONS

Grimmell Catalog GC–97, Gurvlok® Copper Method, 1997, 16 pages.

* cited by examiner

*Primary Examiner*—Lesley D. Morris
*Assistant Examiner*—D. Austin Bonderer
(74) *Attorney, Agent, or Firm*—Joseph J. Pophal

(57) ABSTRACT

A valve for controlling fluid flow is provided. The valve includes an actuating stem for controlling the flow of fluid through the valve, a valve member with a positioning formation and an opening for permitting fluid flow, a valve body portion, and at least one insert or compressor for retaining the valve member within the valve body portion. The valve body portion is comprised of a formable material—such as a metal—that is formed about the valve member in connection with an applied load. The valve body portion further includes a first open end with a first diameter; a second open end with a second diameter that is sufficiently large enough to permit insertion of the valve member; a stem opening for receiving the actuation stem; and an internal member-receiving portion for receiving the valve member in proximity with the stem opening. The actuation stem is in communication with the positioning formation of the valve member and the flow of fluid through the valve is controlled by the orientation of the valve member within the internal member-receiving portion. A method for forming a valve is also disclosed.

48 Claims, 5 Drawing Sheets

VALVE AND METHOD FOR FORMING VALVE

FIELD OF THE INVENTION

The present invention relates generally to a valve suitable for use as a service or shut-off valve. More particularly, the present invention relates to a valve having a one-piece formed valve body portion that is suitable for use in bi-directional valve applications and/or higher-pressure valve applications, such as those involving refrigerants. The invention also relates to a method for forming such a valve.

BACKGROUND OF THE INVENTION

Ball valve and bi-directional ball valve assemblies for controlling the flow of fluids are known in the art. Conventional ball valves used in high-pressure applications commonly use a two-piece brass body in which the pieces are threaded or welded together to encapsulate a ball and associated ball seals. Certain other on-off ball valves, such as those used for lower-pressure applications wherein potential leaks are less dangerous (e.g., conducting water), have utilized a one-piece formed body to eliminate body joints and body seals. However, conventional one-piece body valves can typically only handle bi-directional bubble tight sealing in low-pressure applications. Sealing and leakage problems can occur with such prior single-piece body constructions when fluids having smaller molecules—such as refrigerants—are used at higher pressures. As such, there exists a need in the industry for a valve with a single-piece body construction that, among other things, (i) is relatively simple to construct using conventional materials and equipment, (ii) is dimensionally compatible with conventional systems, (iii) has sufficient fluid sealing characteristics, (iv) can be bi-directional, (v) can have body portions with various structural configurations, and (vi) is suitable for use in applications involving higher pressures.

SUMMARY OF THE INVENTION

The present invention recognizes the aforementioned challenges and the limitations associated with conventional one and two-piece valve body assemblies. The invention provides a valve having a one-piece formed body portion that is suitable for bi-directional and higher-pressure applications. The valve of the present invention utilizes a unique body portion construction that may be formed from a "tubing" using conventional forming techniques. The body portion is typically comprised of a metal, such as copper, aluminum, etc., but may also be formed of a plastic. Moreover, the valve of the present invention may be "bi-directional," wherein it can generally seal pressure on either side of the valve.

Generally, higher-pressure applications—such as those used for refrigeration—commonly utilize a two-piece body construction, in which one or both of the body pieces is comprised of a relatively more expensive metal, such as brass. The one-piece body portion of the present invention provides a part with good functional and sealing characteristics, while eliminating the need for significant portions of the valve body to be comprised of brass components, which often involves higher overall component cost. Such a unitary valve body construction can permit the realization of significant cost savings. Further, the valve body portion can be readily produced using conventional manufacturing techniques without requiring significant capital investment, resulting in a valve assembly that is actually more versatile and less expensive to produce.

In accordance with a preferred embodiment of the present invention, a valve for controlling fluid flow is provided. The valve includes an actuating stem for controlling the flow of fluid through the valve; a valve member with a positioning formation and an opening for permitting fluid flow; a one-piece valve body portion; and at least one insert or compressor for retaining the valve member within the valve body portion. The valve body portion is comprised of a formable material, such as copper, and includes a first open end with a first diameter; a second open end with a second diameter that is sufficiently large enough to permit insertion of the valve member; a stem opening for receiving the actuation stem; and an internal member-receiving portion for receiving the valve member in proximity with the stem opening. The actuation stem is in communication with the positioning formation of the valve member and the flow of fluid through the valve is controlled by the orientation of the opening of the valve member within the internal member-receiving portion.

BRIEF DESCRIPTIONS OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Referring now to the drawings, the preferred embodiments of the present invention are described in detail.

Figures 1, 2:
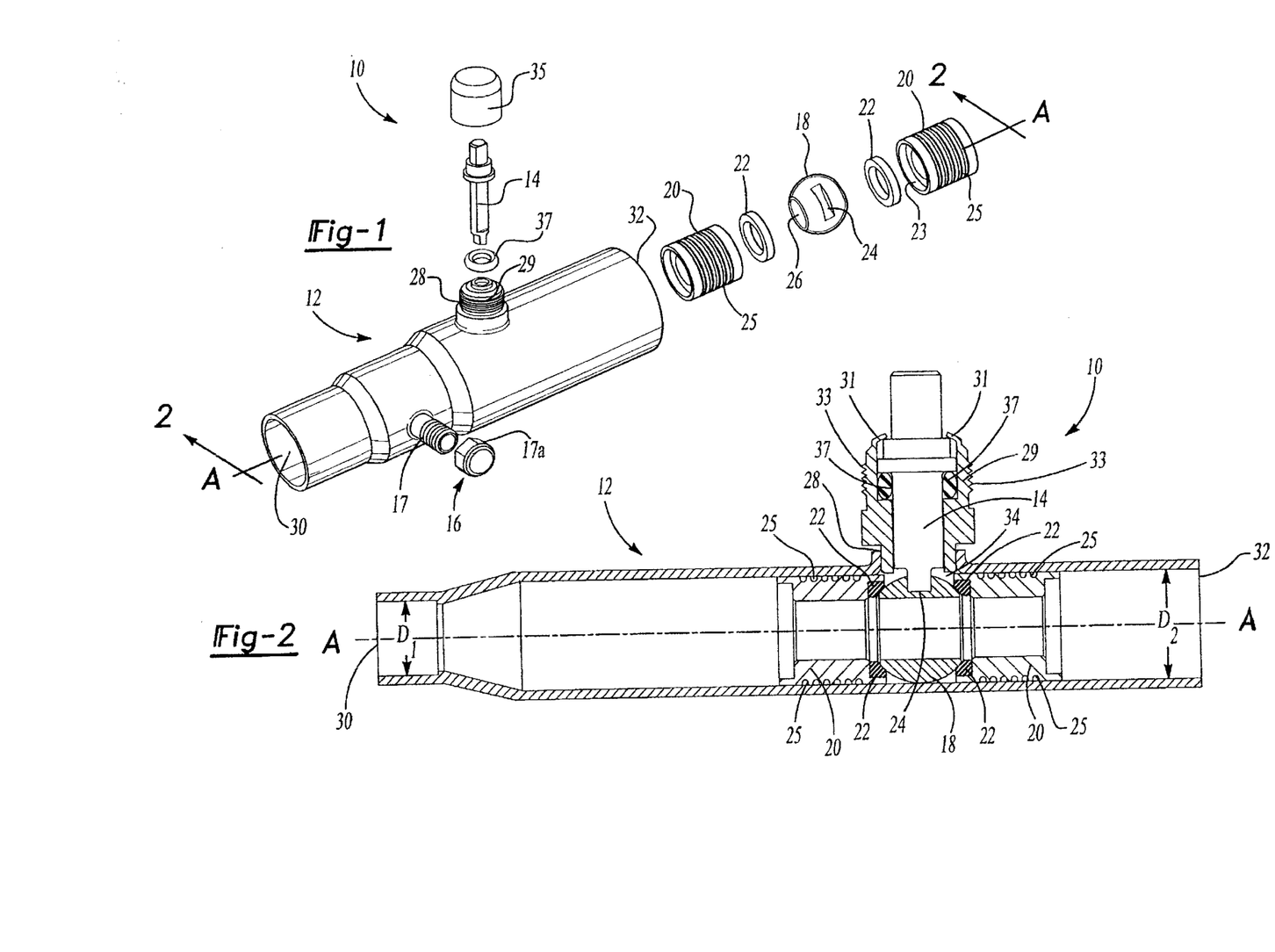
FIG. 1 is a perspective view of an embodiment of the present invention showing the valve with internal components of the valve body portion removed and shown unassembled.
FIG. 2 is a partial sectional side view of a valve similar to that shown in FIG. 1 with the internal components of the valve body assembled and taken along the general direction of lines 2–2 of FIG. 1.

Referring to FIG. 1, a bi-directional valve 10 for conducting fluid is shown with the primary internal components of the valve disassembled. The valve 10 preferably includes a valve body portion 12, an actuation stem 14 for controlling fluid flow through the valve 10, a charge port 16, a valve member 18, and an insert 20 with a seal 22.

A preferred valve member 18 includes a positioning formation 24 and an opening 26 or passage to permit fluid to flow through the valve member 18. The valve member 18 is preferably "ball-shaped," but is not so limited and can take on any number of shapes that provide the necessary flow and sealing characteristics. Preferably, the positioning formation includes an elongated slot or groove that does not pass into or through the valve member opening 26. However, as long as the positioning formation 24 of the valve member 18 provides the necessary function and control in direct or indirect communication with the actuation stem 14, the formation 24 can be formed in a multitude of configurations having various sizes, depths and/or shapes. The valve member 18 is preferably formed from a metal, such as brass, but can also be formed from other durable materials, including, without limitation, nylons, Teflon or other metals or plastics.

The valve body portion 12 is preferably comprised of a metal, such as copper, which can generally be formed from a cylindrical formation or "tube" using conventional forming techniques. However, depending upon the functional requirements of the application, the valve body portion 12 can also be comprised of aluminum, brass, steel, plastics, or other formable materials that provide acceptable functional characteristics. Moreover, the one-piece body portion is not limited to being comprised of a single material and can be comprised of various combinations of acceptable materials. For example, without limitation, the body portion 12 can embody a one-piece construction having an outer layer of copper with a brass lining.

A preferred body portion 12 includes a stem opening 28, a first open end 30 with a first diameter $D_1$ and a second open end 32 with a second diameter $D_2$. The valve body portion 12 includes a passageway that extends along a longitudinal axis A from the first open end 30 to the second open end 32. For purposes of assembly, one of the diameters, in the depicted embodiment, $D_2$, should be sufficiently large enough—at least during the initial assembly—to permit the insertion of the valve member 18. By providing a valve body portion with a sufficiently large initial diameter, the valve body portion 12 can be formed from a single piece, rather than multiple pieces that require proper connection about the internal components. The body portion 12 further includes an internal member-receiving portion 34 for receiving the valve member 18 in proximity with the stem opening 28. Preferably, a portion of the actuation stem 14 will extend through the stem opening 28 and will be in communication with the valve member 18, and more specifically, the positioning formation 24.

The flow of fluid through the valve 10 is generally controlled by the orientation of the valve member 18 within the member-receiving portion 34, and more particularly, the orientation of the valve member opening 26 relative to the primary direction of fluid flow through the valve body portion 12. The rotational position and orientation of the actuation stem 14 directly or indirectly controls the orientation of the valve member 18. However, the actuation stem 14 can also serve to help maintain the position of the valve member 18 within the member-receiving portion 34.

The valve 10 is shut off or "closed" by rotating the actuation stem 14 about its longitudinal axis, thereby rotating the valve member opening 26 by a predetermined rotational amount (e.g., 90 degrees) relative to the primary direction of flow through the openings of the valve 10. In the "open" position, the valve member opening 26 is generally in linear alignment with the openings of the valve body portion 12 and permits the flow of fluid through the receiving portion 34 of the body portion 12, preferably without substantial obstruction. The volume of flow through the valve 10 can be controlled or incrementally increased or decreased depending upon the orientation of the opening 26 between the fully "open" and "closed" positions. The valve is often said to be "bi-directional" if it can seal pressure on either side of the valve member 18. Moreover, the term "fluid" is meant to mean a liquid, gas, or intermediate condition or combination thereof, which can vary in state depending upon the conditions associated with a particular application.

A charge port 16, such as illustrated in FIGS. 1 and 2, provides an access passageway to the fluid in the valve 10 through the valve body portion 12. In a preferred construction, the charge port 16 includes an outwardly extending charge port stem 17. The lower segment of the charge port stem 17 may be firmly connected to the body portion 12 using conventional manufacturing techniques, such as those employed to connect an actuation port 29 to the stem opening 28 of the valve body portion 12. In similar fashion, the charge port stem 17 may include threads on its outer surface along with a corresponding cap 17a. The charge port 16 can provide a convenient point of access to measure the fluid pressure in the system and an access passage to add or remove fluid or fluids to or from the system as may be necessary or desirable.

As previously noted, the valve body portion 12 and specific portions thereof can be constructed using different conventional forming techniques and methods. For example, the stem opening 28 and charge port 16 can be formed by "T-drilling" or other conventional forming processes that push, pull, or otherwise form the material from specific locations on the body portion 12 to create the desired openings or ports. Further, other portions of the body portion 12 may be formed or modified in specific portions or segments by conventional body forming techniques. For example, the diameter of segments of the valve body portion 12, can be "reduced" or further formed to facilitate connection to other components or to better position or retain certain internal components. Some common body forming techniques include, without limitation, crimping, rolling, swaging, hydro-forming, or magne-forming.

FIG. 2 is a partial cross sectional side view of the valve of FIG. 1 shown with the internal components in their assembled condition. As illustrated, the insert 20—which is preferably comprised of a metal (such as brass or other acceptable material)—is used to retain the valve member 18 in the member-receiving portion 34 of the body portion 12. In a preferred embodiment, the insert 20 includes a separate seal 22, a recess 23 for receiving a seal and a plurality of threads or ridges 25 for facilitating the connection and surface-to-surface interface between the inserts 20 and the internal walls of the valve body portion 12. The seal 22 preferably includes a surface that will become curved or a pre-formed curved face that has a contour corresponding to the generally spherical exterior surface of the valve member 18 to effect the sealing engagement therewith when the valve member 18 is urged against one or more seals 22. The seal can be formed of a plastic component or elastomer, such as PTFE, Teflon, "packing material," or other suitable material capable of effecting a fluid-tight seal against the valve member 18.

To provide improved sealing, the valve member 18 is positioned in the member-receiving portion 34 between the inserts 20, and more preferably between seals 22 positioned at least partially within a recess 23 in the inserts 20. To facilitate the connection to the actuation stem 14 to the valve member 18, the positioning formation 24 of the valve member 18 is positioned under and generally oriented to face the stem opening 28. Although not a requirement, in a preferred construction, the actuation stem 14 is connected to the positioning formation 24 prior to the formation of the valve body portion 12 to improve the positioning of the valve member 18 in the proper location in the member-receiving portion 34.

After the valve member 18 and inserts 20 (preferably with seals 22 intended to contact the valve member 18) are in proper position and the valve member 18 is properly orientated, a mechanical load—typically a linear load—is applied to at least one of the inserts. The load is applied to the side of the insert 20 opposite the valve member 18 and forces or urges the insert 20 (and corresponding seal 22, if any) in the direction of and into improved sealing contact with the valve member 18. In the preferred embodiment, generally equivalent counter-directed linear loads are applied to each of two inserts 20, which are positioned on opposing sides of the valve member 18. With a load applied and the internal components are properly positioned and in operative contact and/or connection to provide sufficient sealing, the valve body portion 12 is formed about the inserts 20. By applying a sufficient and appropriate load during at least the initial period during the body formation process, an improved seal is provided between both the inserts 20 and the valve member 18 and the inserts 20 and the valve body portion 12.

As previously mentioned, the valve body portion 12 can be formed using a variety of conventional body forming techniques appropriate for the materials being formed. Such techniques may include, without limitation, crimping, rolling, swaging, hydro-forming, or magne-forming. Moreover, to further improve the seal between the inserts 20 and the valve body portion 12, the inserts 20 can include a plurality of ridges 25. The ridges 25 can provide tighter surface-to-surface contact between the inserts 20 and the valve body portion 12 during and after formation and further improve the sealing function of the valve. In a preferred embodiment, the inserts 20 and valve body portion 12 are comprised of a metal and are formed to have tight metal-to-metal surface contact. Such improved surface-to-surface contact provides an improved seal therebetween, particularly when the valve member 18 is under increased pressure in the "closed" orientation.

As also shown in FIG. 2, a generally annular actuation port 29 is connected to the valve body 12. The actuation port 29 is brazed or otherwise suitably affixed to the stem opening 28—and preferably to the inner wall of the opening 28. The actuation port 29 extends from the end connected in the stem opening 28 to a free end 31 and is preferably bent inwardly to define a restricted opening smaller in size than the remainder of the interior wall portion of the actuation port 29. The free end 31 functions to provide a means for retaining the actuation stem 14, particularly when the lower portion of the actuation stem 14 is urged radially outwardly from the stem opening 28 by fluid pressure from the system.

The actuation port 29 is preferably provided with outwardly facing threads 33 to which a cap 35 may be correspondingly affixed. When secured, the cap may provide a further means to secure the actuation stem and to prevent separation of the stem 14 from the valve 10 and/or the assembly 10. The cap 35 can also provide an additional metal-to-metal seal and serve to prevent fluid (e.g., refrigerant) loss. Moreover, the cap 35 may prevent undesirable foreign elements, such as water or dirt, from interfering with the operation of the valve 10 or causing corrosion.

In a preferred construction, the actuation stem opening 28, actuation port 29 and actuation stem 14 are formed and machined to very specific and defined dimensions and tolerances to provide a sufficiently tight seal that is capable of adequately sealing a refrigerant in a gaseous state. The actuation stem 14 also preferably includes an annular groove for supporting an actuation stem seal 37—such as an O-ring. The actuation stem seal 37 functions to prevent the escape of fluid from the system. Such a preferred valve 10 construction can provide a seal that permits less than a tenth of an ounce (0.10) of refrigerant (in its gaseous state) leakage per year.

Charge ports 16 such as those shown in FIGS. 1 and 2 ay be used as sampling ports for testing and other diagnostic purposes without requiring disconnection and promoting accidental discharge or leakage from the valve. Generally, the charge port 16 can be located or positioned as desired to meet the needs of a given application.

Figure 3:
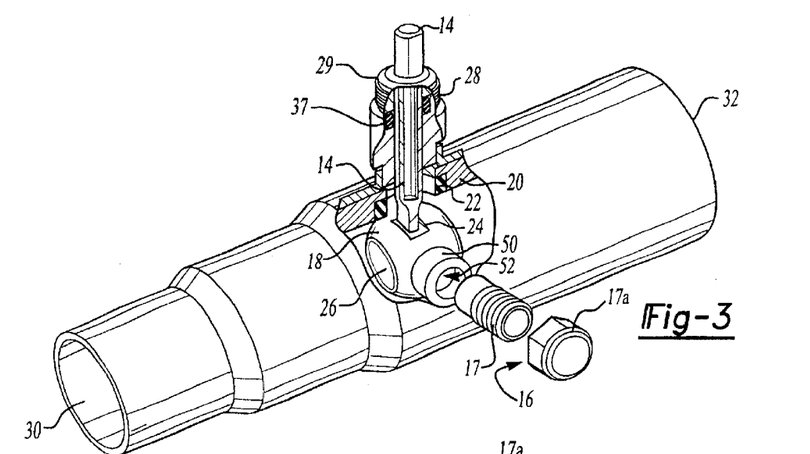
FIG. 3 is a perspective view of another embodiment of the present invention including a modified embodiment of the valve member.
Figure 4:
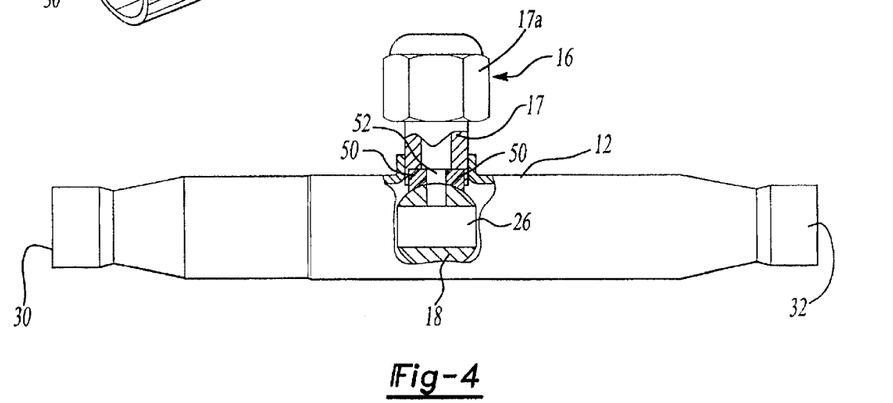
FIG. 4 is a partial sectional top view of an embodiment of the present invention similar to that shown in FIG. 3.
Figure 5:
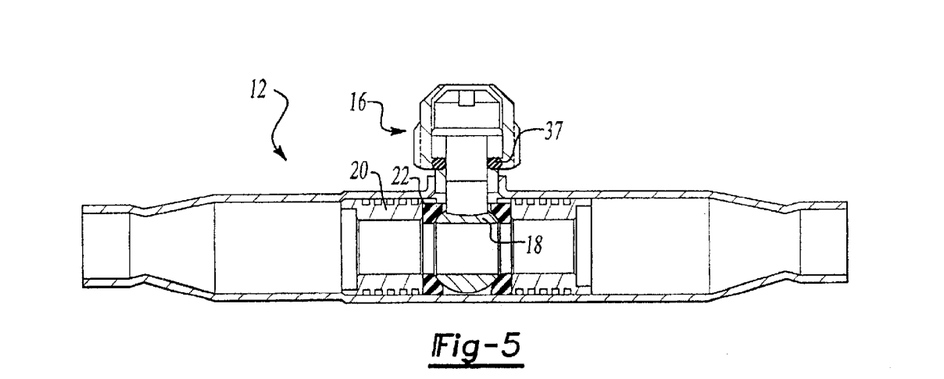
FIG. 5 is a partial sectional view of an embodiment of the invention similar to that shown in FIG. 3.

Another embodiment of the valve 10 of the present invention that includes a "three-way valve member" 18 is illustrated in FIGS. 3–6. As depicted in the isometric view shown in FIG. 3, a charge port 16 may be positioned substantially adjacent to a valve member 18 that includes a third, side passage or flow opening 52. It should be noted that FIGS. 4 and 5 illustrate an embodiment of the invention wherein the first open end 30 and second open end 32 of the valve body portion 12 have been formed, at least one of which was formed following the insertion and formation about the inserts 20 and/or valve member 18.

In a preferred construction, the flow opening 52 extends through one-half of the three-way valve member 18 and is generally transverse or perpendicular to the opening 26 of the valve member 18. Preferably, the diameter of the flow opening 52 is smaller than the size of the primary valve member opening 26. However, the flow opening 52 may be sized to provide acceptable integration, sampling or testing information, such as the level of pressure in the valve 10.

FIG. 4 depicts a partial sectional top view of the valve shown in FIG. 3. As illustrated, a charge port seal 50 or port seals are preferably included and positioned to provide a seal between the flow opening 52 and the charge port 16. The charge port seals 50 can be comprised of the same materials previously discussed in connection with the actuation stem seals 37.

FIG. 5 is a partial sectional side view of the valve shown in FIG. 3. Moreover, FIG. 5 illustrates the communication of the valve member 18 with the actuation stem 14, wherein the flow opening 52 and charge port 16 are oriented and directed perpendicularly outward relative to the plane of the drawing sheet. The actuation stem 14 controls the rotation and orientation of the valve member 18 and the alignment of the flow opening 52 relative to the charge port 16. The figure illustrates a three-way valve member 18 that can be rotated and oriented. While intermediate orientations of the three-way valve member 18 are possible, the primary orientations between the valve member 18, the valve body portion 12 and the charge port 16 are at 90-degree intervals. While not specifically limited, the primary available orientations are as follows: (a) the valve member opening 26 can be in the "open" position relative to the valve body portion 12 and the flow opening 52 can be aligned with the charge port 16 (as shown in FIGS. 3 and 4); (b) the valve member opening 26 can be in the "open" position relative to the valve body portion 12 and the flow opening 52 can be aligned 180 degrees from the charge port 16; or (c) the valve member opening 26 can be in the "closed" position relative to the valve body portion 12 and the flow opening can be aligned with the flow of fluid though the body portion 12 on either side of the valve member 18.

Figure 6:
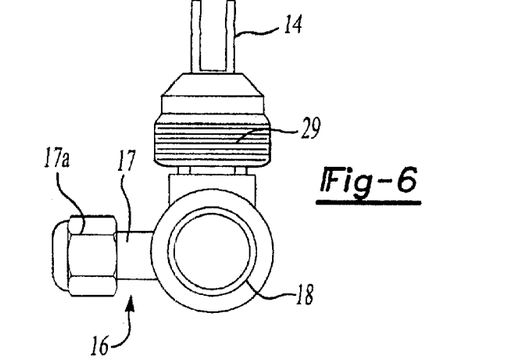
FIG. 6 is an isolated view of the actuation stem, the valve member and the charge port shown in FIG. 3.

FIG. 6 is an isolated view of the actuation stem 14, the valve member 18 and the charge port shown in FIG. 3. In a preferred embodiment utilizing a three-way valve member, the actuation stem 14 and the charge port 16 are substantially perpendicular to one another.

Figure 7:
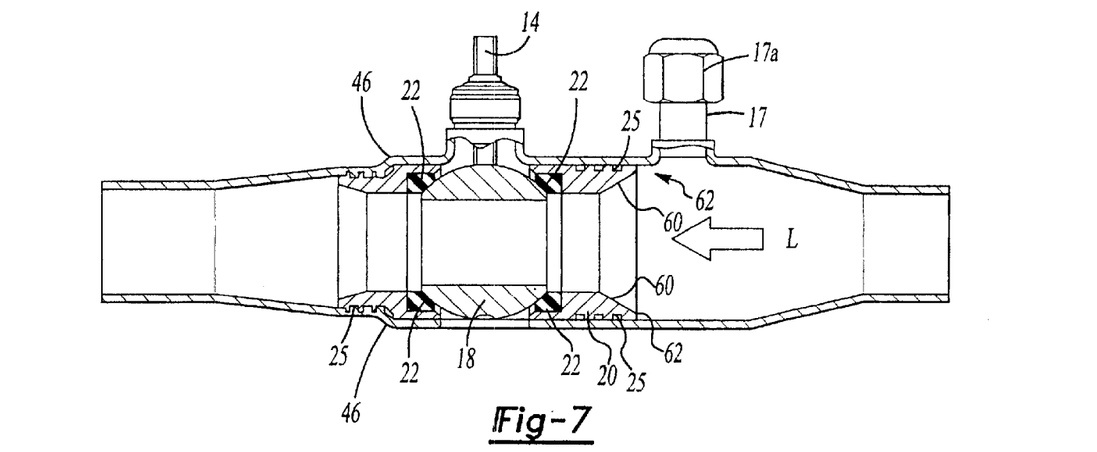
FIG. 7 is a partial sectional side view of another embodiment of the present invention that includes a shoulder and modified insert.

Yet another embodiment of the present invention is shown in FIG. 7. As depicted, the valve body portion 12 may include one or more shoulders 46. Shoulders 46 are not required, but provide an additional element for applying a linear load L to one insert 20 located on the opposite side of the valve member 18 as the shoulder 46—rather than applying two opposed loads (one to each insert). As in the case of the previous embodiments, the load is applied prior to or during the formation of the valve body portion 12 and should be sufficient to provide a tight seal between the valve member 18 and the inserts 20.

The inserts 20 shown in FIG. 7 include angled portions 60 that are located on the ends of the inserts 20 opposite the ends adjacent to valve member 18. Such angled portions 60 can function to facilitate flow through the valve 10. Moreover, such angled portions 60 may include a small annular edge 62 to facilitate the application of a linear load during the formation of the valve body portion 12 by providing a surface that is generally perpendicular to the applied load.

The present invention provides an additional advantage over conventional systems in that the valve can be incorporated and positioned as generally desired within one-piece body portions having more complicated geometric configurations. With such capabilities, the body portion can be readily formed and configured to better suit the structural limitations of specific valve applications. For instance, without limitation, a valve can include a body portion with more complicated designs, such as a valve having one or more non-linear or curved segments. During assembly, the internal components of the valve 10 can be inserted through an open end of the body portion and purposefully positioned within the body portion, for example, against a modified diameter segment—such as a shoulder (such as illustrated in FIG. 7)—or other integral or separate formations. Such formations can be used to position the components and help retain the components during the application of a load and/or the formation of the valve body portion about the valve member.

Figure 8:
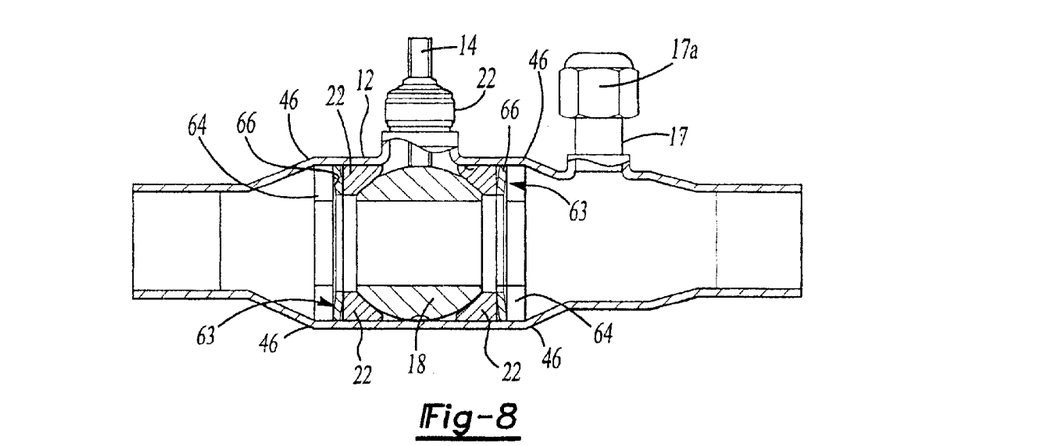
FIG. 8 is a partial sectional side view of still another embodiment of the present invention that includes a shoulder and a compressor in the form of pairs of washers positioned on opposite sides of the valve member.

FIG. 8 illustrates still another embodiment of valve of the present invention. The valve 10 of the depicted embodiment includes a set of shoulders 46 and seals 22 positioned about the valve member 18. In this embodiment, the seals 22 provide a tight seal between the valve member 18 and the valve body portion 12 at the same time. To improve the sealing quality, the preferred construction also includes at least one compression mechanism or compressor 63 positioned on one or both sides of the valve member 18 and the respective seals 22.

Preferably, the valve member 18 and inserts 22 are firmly positioned or "sandwiched" between a pair of compressors 63. The compressors 63 may include, without limitation, a pair of flat washers 64 and spring washers 66 (as illustrated in FIG. 8) or other types of springs or conventional compression-type mechanisms, particularly those used in connection with hollow cylindrical articles. Such compressors or compression mechanisms provide a "pre-load" and/or a "continuous" load that continues to exert a force toward the valve member 18 beyond the application of any external load associated with the formation of the valve body portion about the compressors 63, seals 22, and/or the valve member 18. Such "continuing" application of one or more forces exerted by one or more compressors 63 can help to compensate for "creep" or reduced pressure over time and thereby provide a tighter and improved seal between the valve member and other connected components of the valve 10 over the life of the valve.

Figure 9:
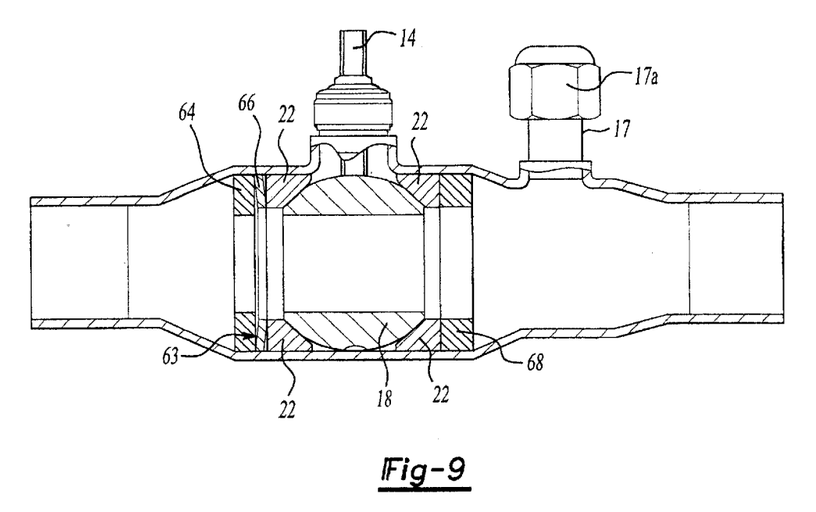
FIG. 9 is a partial sectional side view of yet another embodiment of the present invention with a compressor in the form of a pair of washers positioned on one side of the valve member.

FIG. 9 shows a similar body valve 10 to that in FIG. 8 in which a compressor 63 (in the form of a flat washer 64 and spring washer 66) is used on one side of the seals 22 and valve member 18. In this embodiment, another washer 68 is positioned on the opposite side of the valve member 18 provides a support surface for the seals 22 located adjacent thereto. To better maintain the position of the valve body portion 12 is formed about the edge of the washer and generally prevents significant outward movement of the washer 68.

Figure 10:
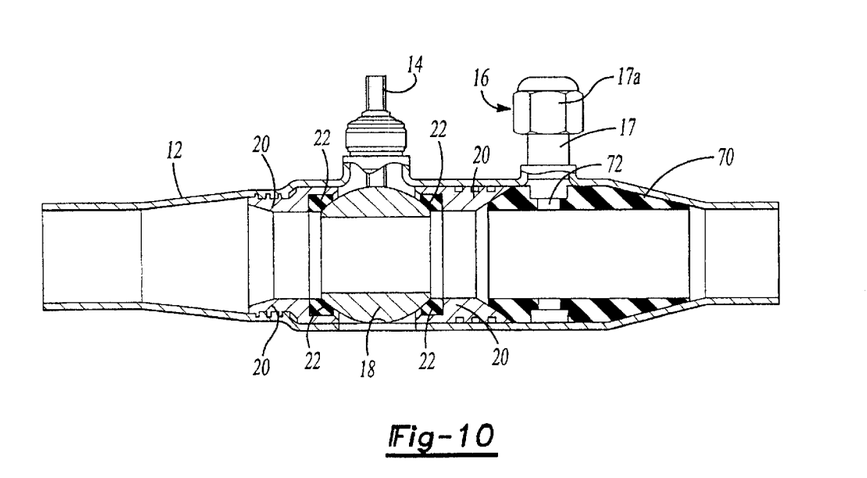
FIG. 10 is a partial sectional side view of still yet another embodiment of the present invention that includes a plastic insert.

The embodiment of the invention illustrated in FIG. 10 includes a path insert 70. The path insert 70 may be used to straighten out the flow providing a more consistent flow and a lesser or reduced pressure drop as the fluid flows through the valve 10. The insert 70 may be formed of a metal, plastic or any suitable material. Also, as shown, the insert may include a generally transverse flow opening 72 in communication with a charge port 16. Moreover, also as depicted, the valve body portion 12 may be formed to hold the annular insert 70 in place within the body portion 12.

In connection with the present invention, mechanical limitations on the range of rotation of the actuation stem 14 can be beneficial in fluid flow applications. Moreover, such mechanical limitations can provide a means to readily and reliably control the rotational orientation of the actuation stem 14 and physically and/or visually indicate the operational orientation of the valve member 18 and opening 26. Such limitations are particularly useful when the valve member 18 is assembled within the valve 10 and is not generally visible. Further, corresponding designations, such as "on," "off" "open," or "closed," can be used with the actuation stem assembly to indicate the orientation of the valve member opening 26 relative to the direction of fluid flow through the valve 10.

For a number of conventional actuation stem assemblies, the mechanical limitations previously described include an actuation port 29 having inner actuation stem limiting formations or "stops." Such limiting formations may take the form of radially inwardly protruding formations, such as ridges, which may engage and restrict the rotational movement of the actuation stem 14. In a number of instances, such limiting formations are formed by machining or removing material from the inner walls of the actuation port. However, the formation of such limiting formations can be intricate, complicated, and expensive—particularly when the opening of the actuation port 29 that receives the actuation stem 14 has small radius. It is therefore often desirable to provide an actuation stem assembly that includes a separately formed member with an inner formation or stop without requiring the machining of the inner surface of the actuation port 29. An example of such an actuation stem assembly 80 is represented in FIGS. 11 and 12.

Figures 11, 12:
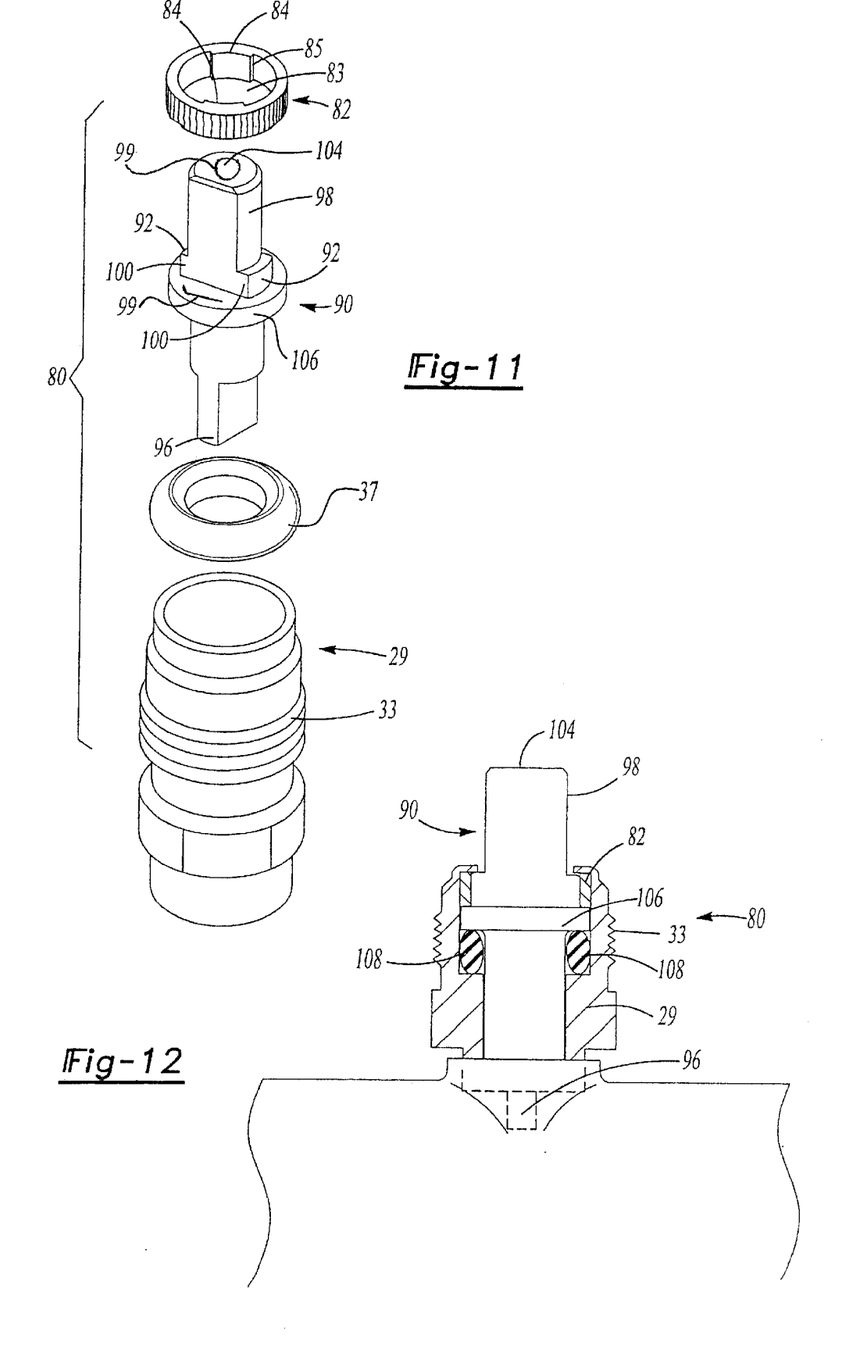
FIG. 11 is an assembly view of an embodiment of an actuation stem including a stem stop.
FIG. 12 is a partial sectional side view of the actuation stem of the type shown in FIG. 11.

FIG. 11 is an assembly view of an embodiment of an actuation stem assembly 80 that includes a separately formed stem stop 82 with an aperture 83 and at least one limiting formation 84 having an edge 85 and an actuation stem 90 with corresponding stem positioning formation 92. The actuation stem 90 is designed to extend through the stem stop aperture 83 and is generally positioned so that the stem positioning formation 92 is in rotational alignment with the edge 85 of the limiting formation 84.

The actuation stem 90 further includes a valve member connector 96 and an extended portion 98. In a preferred embodiment, the actuation stem 90 includes a plurality of stem positioning formations 92 having formation edges 100; an extended portion 98 with an upper surface 104; and a radially extending annular ridge 106. The upper surface 104 or other surfaces on the actuation stem 90 or actuation port 29 may include use-related designations or symbols 99, such as, but not limited to the designations "on," "off," "open," or "closed." Such designations or symbols 99 can be coordinated with the assembly 80 to identify the current orientation of the valve member 18. Moreover, the assembly 80 preferably includes at least one seal 108 that is positioned beneath the annular ridge 106 of the actuation stem 90.

The stem stop 82 and corresponding actuation stem 90 are preferably comprised of metal, but can be formed from any number of other materials, including plastics, provided the assembly 80 exhibits the requisite mechanical function and sealing quality for the desired application. FIG. 12 is a partial sectional side view of the actuation stem of the type shown in FIG. 11.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A valve for conducting fluid under pressure, said valve comprising:
    an actuation stem for controlling fluid flow through the valve;
    a valve member having a positioning formation and an opening for permitting fluid flow through the valve member;
    a one-piece, unitary valve body which encloses the valve member having a first open end with a first diameter; a second open end with a second diameter, which at least during initial assembly of the valve member and body is sufficiently large to permit insertion of the valve member;
    a stem opening for receiving the actuation stem; and
    an internal member-receiving portion for receiving the valve member in proximity with the stem opening; and
    a pair of inserts, each insert including an opening for permitting fluid flow, wherein the valve member is positioned between the inserts, at least one insert having a load applied against it during assembly of the valve, and wherein the valve body is formed about the inserts to provide a seal between the inserts and the valve member and the inserts and the valve body wherein the valve body permanently retains the valve member in the valve body; and
    whereby the actuation stem is in communication with the positioning formation of the valve member and the flow of fluid through the valve is controlled by the orientation of the valve member within the internal member-receiving portion.

2. A valve as recited in claim 1, wherein the valve body is comprised of metal.

3. A valve as recited in claim 2, wherein the metal is selected from the group consisting of copper, aluminum, brass, and steel.

4. A valve as recited in claim 1, wherein the insert is comprised of a metal.

5. A valve as recited in claim 1, wherein the insert includes a seal.

6. A valve as recited in claim 5, wherein the seal is comprised of material selected from the group consisting of an elastomeric and a plastic.

7. A valve as recited in claim 5, wherein the seal of the insert is in communication with the valve member.

8. A valve as recited in claim 1, wherein the valve member is comprised of metal.

9. A valve as recited in claim 1, wherein the valve body includes a charge port.

10. A valve as recited in clam 1, wherein the valve member includes a flow opening that is generally transverse to the valve member opening and the valve body includes a charge port adjacent to the valve member.

11. A valve as recited in claim 10, wherein the actuation stem controls the orientation of the valve member and the alignment of the flow opening with the charge port.

12. A valve as recited in claim 1, wherein the actuation stem includes a stem stop to limit the rotational movement of the actuation stem relative to the stem opening.

13. A valve as recited in claim 1, wherein the valve body portion includes a shoulder.

14. A valve as recited in claim 1, wherein the insert includes an angled portion to facilitate the flow of fluid.

15. A valve as recited in claim 1, wherein the valve includes a flow insert positioned substantially adjacent to the insert to facilitate flow through the valve.

16. A valve as recited in claim 1, wherein the valve body includes a non-linear segment.

17. A valve as recited in claim 1, wherein the valve body is mechanically deformed into engagement with the inserts.

18. A valve as recited in claim 17, wherein each insert includes a contoured outer surface for facilitating a surface-to-surface seal between the respective insert and internal walls of the valve body.

19. A valve as recited in claim 1, wherein the valve body comprises a tube.

20. A valve suitable for conducting fluid under pressure, said valve comprising:
    an actuation stem for controlling fluid flow through the valve;
    a valve member having a positioning formation and an opening for permitting fluid flow through the valve member;
    a one-piece, unitary valve body which encloses the valve member having a first open end with a first diameter;
    a second open end with a second diameter, which at least during initial assembly of the valve member and body, is sufficiently large to permit insertion of the valve member;
    a stem opening for receiving the actuation stem; and
    an internal member-receiving portion for receiving the valve member in proximity with the stem opening; and
    at least one compressor, the compressor including an opening for permitting fluid flow past the compressor, wherein the valve member is positioned adjacent to a compressor and wherein the valve body is formed about the compressor to provide a seal between the compressor and the valve member and the compressor and the valve body wherein the valve body permanently retains the valve member in the valve body; and whereby the actuation stem is in communication with the positioning formation of the valve member and the flow of fluid through the valve is controlled by the orientation of the valve member within the internal member-receiving portion.

21. A valve as recited in claim 20, wherein a seal is positioned between the compressor and the valve member.

22. A valve as recited in claim 20, wherein a compressor is positioned on opposite sides of the valve member, and each compressor exerts a force in the direction of the valve member following formation of the valve body.

23. A valve as recited in claim 20, wherein the compressor includes a spring washer.

24. A valve as recited in claim 23, wherein the compressor further includes a flat washer.

25. A valve as recited in claim 20, wherein the compressor includes a spring.

26. A valve as recited in claim 20, wherein the valve body includes a shoulder.

27. A valve as recited in claim 20, wherein the valve includes a flow insert positioned substantially adjacent to the insert to facilitate flow through the valve.

28. A valve as recited in claim 20, wherein the valve body includes at least one non-linear segment.

29. A valve as recited in claim 20, wherein the valve body is mechanically deformed to retain the compressor within the valve body.

30. A valve as recited in claim 20, wherein the valve body comprises a tube.

31. An actuation stem assembly suitable for use with a valve member having a positioning formation, said actuation stem assembly comprising:
   an actuation stem including an extended portion toward one end of the stem; a valve member connector toward another end of the stem; an annular, radially-outward projecting ridge between the extended portion and the valve member connector; and a stem positioning formation having edges that extend radially outward beyond the extended portion, the stem positioning formation located between the annular ridge and the extended portion; and
   a stem stop including an aperture and a stem stop limiting formation with a stem stop formation edge, said stop limiting formation extending from the stem stop limiting formation into the aperture, wherein the actuation stem extends through the stem stop aperture and the stem positioning formation is in rotational alignment with the stem stop formation edge.

32. An actuation stem assembly as recited in claim 31, wherein the positioning of the stem stop formation is coordinated with the open and closed positions of the valve member.

33. An actuation stem assembly as recited in claim 31, wherein the extended portion of the actuation stem includes an upper surface with a use-designating symbol.

34. An actuation stem assembly as recited in claim 31, further including an annular resilient seal positioned around the actuation stem and against a side of the annular ridge opposite from the stem positioning formation.

35. A method for forming a valve suitable for conducting fluid under pressure, including the steps of:

providing an actuation stem for controlling fluid flow through the valve;

providing a valve member having a positioning formation and an opening for permitting fluid flow through the valve member;

providing a one-piece, unitary valve body having a first open end with a first diameter; a second open end with a second diameter, which at least during initial assembly of the valve member and body is sufficiently large to permit insertion of the valve member; a stem opening for receiving the actuation stem; and an internal member-receiving portion for receiving the valve member in proximity with the stem opening;

providing a pair of inserts, each insert including an opening for permitting fluid flow; inserting the inserts and valve member within the valve body so that the valve member is positioned between the inserts;

applying a load to at least one of the inserts; and then forming the valve body about the inserts to provide a seal between the inserts and valve member and the inserts and the valve body wherein the valve body permanently retains the valve member in the valve body portion.

36. A method as recited in claim 35, wherein the valve body portion is comprised of metal.

37. A method as recited in claim 35, wherein the inserts include a seal.

38. A method as recited in claim 37, wherein the seals are positioned adjacent to the valve member.

39. A method as recited in claim 35, wherein a substantially linear load is applied to each of the inserts prior to a radial deformation of the valve body.

40. A method as recited in claim 35, wherein the valve body is formed to include at least one non-linear segment.

41. A method as recited in claim 35, wherein the step of forming the valve body comprises mechanically deforming the valve body into engagement with the inserts.

42. A method as recited in claim 41, wherein each insert includes a contoured outer surface for facilitating a surface-to-surface seal between the respective insert and internal walls of the valve body, and the step of forming the valve body further includes mechanically deforming the valve body into engagement with the contoured outer surface.

43. A method for forming a valve suitable for conducting fluid under pressure, including the steps of:

providing an actuation stem for controlling fluid flow through the valve;

providing a valve member having a positioning formation and an opening for permitting fluid flow through the valve member;

providing a one piece, unitary valve body having a first open end with a first diameter; a second open end with a second diameter, which at least during initial assembly of the valve member and body, is sufficiently large to permit insertion of the valve member; a stem opening for receiving the actuation stem; and an internal member-receiving portion for receiving the valve member in proximity with the stem opening;

providing a compressor, the compressor including an opening for permitting fluid flow, inserting the compressor and valve member within the valve body so that the valve member is positioned in connection with the compressor;

applying an external load to the opposite side of the valve member in the direction of the compressor during formation of the valve; and then forming the valve body about the compressor to provide a seal between the compressor and valve the member and the compressor and the valve body wherein the valve body permanently retains the valve member in the valve body.

44. A method as recited in claim 43, wherein a seal is positioned between the compressor and the valve member.

45. A method as recited in claim 43, wherein a compressor is provided on each side of the valve member.

46. A method as recited in claim 43, wherein the valve body is formed to include at least one non-linear segment.

47. A method as in claim 43, wherein the step of forming the valve body comprises mechanically deforming the valve body to retain the compressor within the valve body.

48. A method as claim 47, wherein the step of forming comprises radially deforming the valve body.

* * * * *